May 11, 1926.
W. McD. CURTIS
1,584,512
AUTOMOBILE HOISTING DEVICE
Filed Dec. 29, 1922
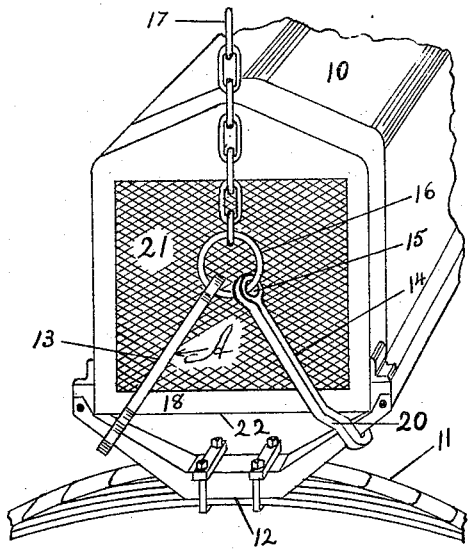
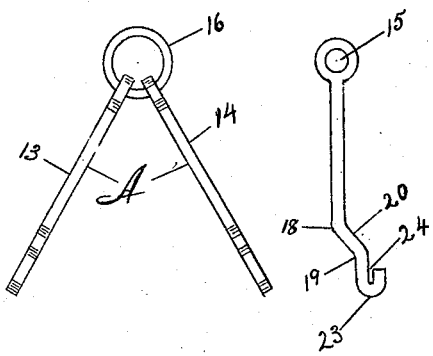
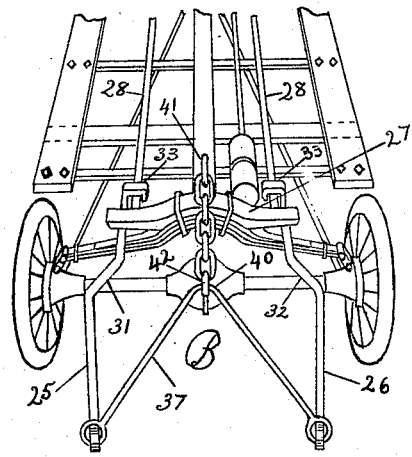
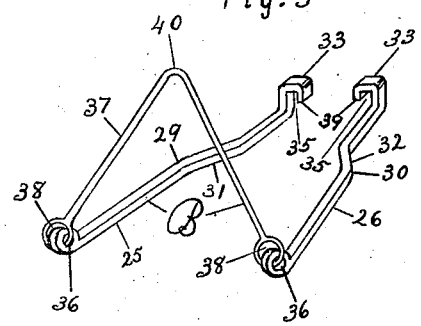
INVENTOR
WALTER M. CURTIS
BY Sprinkle Hopkins & McNair.
ATTORNEYS Patented May 11, 1926.

1,584,512

UNITED STATES PATENT OFFICE.

WALTER McDONALD CURTIS, OF WOODLAND, ILLINOIS.

AUTOMOBILE HOISTING DEVICE.

Application filed December 29, 1922. Serial No. 609,565.

The primary object of the invention is to provide a device by which an automobile may be raised bodily from a garage floor or the like by its respective ends.

A further object of the invention is to provide a device by which either end of an automobile may be raised independently of the other end.

A further object of the invention is the provision of improved means adapted for hoisting and suspending the respective ends of a motor car and particularly the popular car of the Ford type in making repairs and replacements thereto or thereon.

The invention is concerned with the provision of improved means for use in connection with power multiplying lifting mechanisms as of the block and tackle type for engaging the respective front and rear ends of the chassis of a Ford car or a car having a similar construction, and it is one of the important objects of the invention to provide an improved means of the described character for securing a lifting engagement with the respective front and rear ends of a motor car so that the car may be freely lifted or hoisted and suspended by chains, wire rope or other analogous lifting devices without danger of the slightest injury to the finish of the body or other highly finished parts of the car.

Other objects of the invention will appear from the following description of the invention which is directed to the preferred embodiment of the invention, as shown also in the accompanying drawing, the novel features being more particularly pointed out in the appended claims.

In the drawing Fig. 1 is a perspective view of the tackle for raising the front end of an automobile shown in engagement with the front body supporting bracket.

Fig. 2 is a perspective view of the tackle for hoisting the rear end of an automobile shown in engagement with the side members of the chassis frame.

Fig. 3 is an elevation view of the tackle for raising the front end of an automobile.

Fig. 4 is an elevation view of one of the arms shown in Fig. 3 and taken at right angles thereto.

Fig. 5 is a perspective view of the tackle for engaging the chassis of an automobile for raising the rear end thereof.

Like reference characters indicate like parts throughout the several views of the drawing.

The improved automobile hoisting device comprises two co-acting tackles indicated by the reference characters A and B, generally. The tackle A is adapted to engage the front end, and the tackle B the rear end of the chassis frame of an automobile for hoisting the automobile from the floor of a garage. The device is so constructed that both ends of an automobile may be raised clear of the floor simultaneously with the bottom of the automobile lying in a substantially horizontal plane, or either end raised independently of the other. Reference character 10 indicates the front portion of an automobile supported on the front spring 11 by the channel iron bracket or bolster 12. Arms 13 and 14 of the front tackle A have eyes 15 formed in their upper ends for passage therethrough of ring 16 to which the end of a hoisting chain or the like 17 may be attached for hoisting the front end of the automobile. Arms 13 and 14 of the tackle A are bent outwardly as at 18 and then bent as at 19, thus forming offset portion 20 for the purpose of projecting the upper parts of the arms outwardly from the bracket 12, which sets inwardly a short distance from the front end of the body 10 thereby allowing clearance for the upper portion of the arms around the front face of the radiator 21, thus avoiding any strain on the radiator frame 21 or danger of injury to finish when hoisting the front end of the automobile. The lower extremities of arms 13 and 14 are bent outwardly and upwardly parallel with the lower portion of the arm as at 23 forming recess 24 for engaging the forward flange of the angle iron supporting bracket 12, as clearly shown in Fig. 1. Arms 25 and 26 of the tackle B for raising the rear end of the automobile are adapted to be fulcrumed on the underside of body supporting bracket 27 and engage the side members 28 of the chassis frame of the automobile, as clearly shown in Fig. 2. These arms 25 and 26 are bent inwardly as at 29 and 30 intermediate their ends with the inner portions of the arms lying in a plane parallel with the outer portions thus forming offset portions 31 and 32. The inner ends of these arms are carried upwardly and formed into hook-like portions 33, which are adapted to overlie and receive in the recesses 35 the side members 28 of the chassis frame. Arms 25 and 26 have formed at their outer ends eyes 36, which are formed above the axes of the arms for a purpose which will presently be described. Bail 37 has formed in its respective ends eyes 38, which engage eyes 36 of arms 25 and 26.

By constructing the rear tackle as just described with the eyes of the arms 25 and 26 above the axes of the arms the bail 37 will have a tendency to rock the arms inwardly on their axes and force the inner ends 38 and 39 of hook-like portions 33 of the arms toward each other when an upward draft is exerted at the crown 40 of the bail 37 by hoisting chain 41 attached to the bail 37, as at 42, for raising the rear end of the automobile, thereby automatically locking the device in engagement with the chassis frame.

Having thus described my invention, what I claim is:

1. A tackle for raising automobiles, comprising a pair of arms, a bail connecting the arms at one of their ends, hook-like members adapted to engage the side members of an automobile chassis frame formed at one end of the arms, the hook-like members being adapted to receive in the recesses of the hooks the side members of the chassis of an automobile frame, and offset portions formed on the arms and extending in a direction outwardly from said hook-like portions whereby the bail connecting said arms rocks said arms in a direction to insure engagement of the hook-like portions with the chassis frame.

2. A tackle for raising automobiles, comprising a pair of arms, a bail connecting the arms at one of their ends, hook-like members adapted to engage the side members of an automobile chassis frame formed at one end of the arms, the hook-like members being adapted to receive in the recesses of the hooks the side members of the chassis of an automobile frame, and offset portions formed in said arm and extending in a direction outwardly from said hook-like portions whereby the bail connecting said arms exerts a crank-like action on said hook-like members in a direction of the hook-like members.

In testimony whereof I have signed my name to this specification, on this 26th day of December A. D. 1922.

WALTER McDONALD CURTIS.